(12) United States Patent
Knight (10) Patent No.: US 8,837,691 B2
(45) Date of Patent: Sep. 16, 2014

(54) MESSAGE FORWARDING SYSTEM

(75) Inventor: Marachel L. Knight, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1270 days.

(21) Appl. No.: 11/948,770

(22) Filed: Nov. 30, 2007

(65) Prior Publication Data

US 2009/0141879 A1 Jun. 4, 2009

(51) Int. Cl.
*H04M 1/64* (2006.01)
*H04M 3/42* (2006.01)

(52) U.S. Cl.
CPC ........ *H04M 3/42382* (2013.01); *H04M 3/4211* (2013.01); *H04M 2203/651* (2013.01); *H04M 3/42042* (2013.01)
USPC ................................. 379/88.22; 379/142.04

(58) Field of Classification Search
CPC ....................... H04M 3/42042; H04M 3/42068
USPC ...................................................... 379/88.22
See application file for complete search history.

(56) References Cited

U.S. PATENT DOCUMENTS

| | | | |
|---|---|---|---|
| 6,970,546 B2 * | 11/2005 | Kent et al. | 379/207.02 |
| 7,912,036 B2 * | 3/2011 | Moore | 370/352 |
| 2003/0215078 A1 * | 11/2003 | Brahm et al. | 379/211.02 |
| 2004/0057566 A1 | 3/2004 | Mallory | |
| 2004/0176142 A1 | 9/2004 | Thrasher | |
| 2005/0152525 A1 | 7/2005 | Kent et al. | |
| 2006/0062369 A1 | 3/2006 | Kent et al. | |
| 2006/0115062 A1 * | 6/2006 | Gonder et al. | 379/142.01 |
| 2007/0105537 A1 | 5/2007 | Mahajan et al. | |
| 2008/0075250 A1 * | 3/2008 | Kent et al. | 379/133 |

\* cited by examiner

*Primary Examiner* — Amal Zenati
(74) *Attorney, Agent, or Firm* — Jackson Walker L.L.P.

(57) ABSTRACT

There is described herein a message forwarding system that is easily adaptable to evolving technologies. In one embodiment, a first user attempts to place a telephone call to a second user, and caller identification (CID) data are encoded into the outgoing call. The call is directed into a public switched telephone network (PSTN) servicing the second user. The PSTN may operate on a modern telephony protocol such as Signaling System #7 and may be equipped with an Advanced Intelligent Network. If the call is not completed, a message including CID information is sent via means such as short messaging service. Because the equipment resides in the PSTN, it is independent of the technology used to receive the transmitted data. Furthermore, the information may be provided even in times of emergency, such as when telephone service to the second user has been disrupted.

22 Claims, 4 Drawing Sheets

MESSAGE FORWARDING SYSTEM

BACKGROUND

1. Field of the Disclosure

The subject matter disclosed herein relates to the field of telephone services, and more particularly to a message forwarding system that may be used in the Public Switched Telephone Network (PSTN).

2. Description of the Related Art

Telephone systems may provide Caller Identification (CID) information that allows a call recipient to determine information regarding the caller's name, caller's telephone number, and time of an originating call. For calls received on a land line, CID information may be displayed on customer premises equipment (CPE). For calls made to a mobile telephone, CID information may be presented on a screen incorporated into the call recipient's mobile telephone.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 102-1 refers to an instance of a widget class, which may be referred to collectively as widgets 102 and any one of which may be referred to generically as a widget 102.

In one aspect, a computer program stored on a computer readable medium is disclosed. The computer program has instructions operable to detect a call to an intended recipient. The call includes a CID signal. The computer program further has instructions operable to determine whether the intended recipient subscribes to a message forwarding service. Further instructions are operable to determine whether the intended recipient wishes to receive the CID information at a secondary communication device. Determining whether the recipient wishes to receive the CID information at a secondary communication device may include accessing a database with stored values representing the call recipient's preferences and rules for determining whether to forward messages containing CID information. Further instructions are operable for composing a message that includes CID information from the CID signal. Instructions are further enabled to deliver the message to the secondary communication device.

In another aspect, a message forwarding device is disclosed for providing a message forwarding system. The message forwarding device includes a central processor unit and a first network interface configured to communicatively couple the central processor unit to a local network of the PSTN. The message forwarding device further includes a storage medium on which are stored or in which are embedded computer-executable instructions operable to verify that the user subscribes to the message forwarding service and to detect an occurrence of an event requiring a message to be forwarded. The storage medium is communicatively coupled to the central processor unit. The storage medium may also include a database. The database may include a plurality of records with data values used to identify whether a user subscribes to a message forwarding service, routing information for a secondary communication device, and whether an event requiring a message to be forwarded has occurred. The message forwarding device further includes a formatting engine communicatively coupled to the central processor unit and configured to format a plurality of messages. A second network interface is configured to communicatively couple the central processor unit to the secondary communication device. Detection of whether an event requiring a message to be forwarded has occurred may be based at least in part on the plurality of records. Further instructions are operable to cause the formatting engine to create a formatted message suitable for the secondary communication device. Creating the formatted message includes accessing the plurality of records. Still further instructions are operable to forward the formatted message to the second communication device through the second network interface.

In still another aspect, a method of providing a message forwarding service includes determining that a received call is directed to a user subscribing to a message forwarding service. The method further includes decoding CID data associated with the received call and creating a message including at least part of the CID data. The message is formatted for sending to a secondary communication device associated with the user. The method further includes delivering the message to the secondary communication device.

In an embodiment, a first user attempts to place a telephone call to a second user, and CID data are encoded into the outgoing call. The call is directed into a local network of the PSTN. The same or another local network services a second user and may operate on a modern telephony protocol such as Signaling System #7 and may be equipped with an Advanced Intelligent Network. If the call is not completed, a message including CID information is sent to the second user. Transmission of the message may be via means such as short messaging service (SMS). Because the equipment resides in the PSTN, it is independent of the technology used to receive the transmitted data. Furthermore, the information may be provided even in times of emergency, such as when telephone service to the second user has been disrupted.

Figure 1:
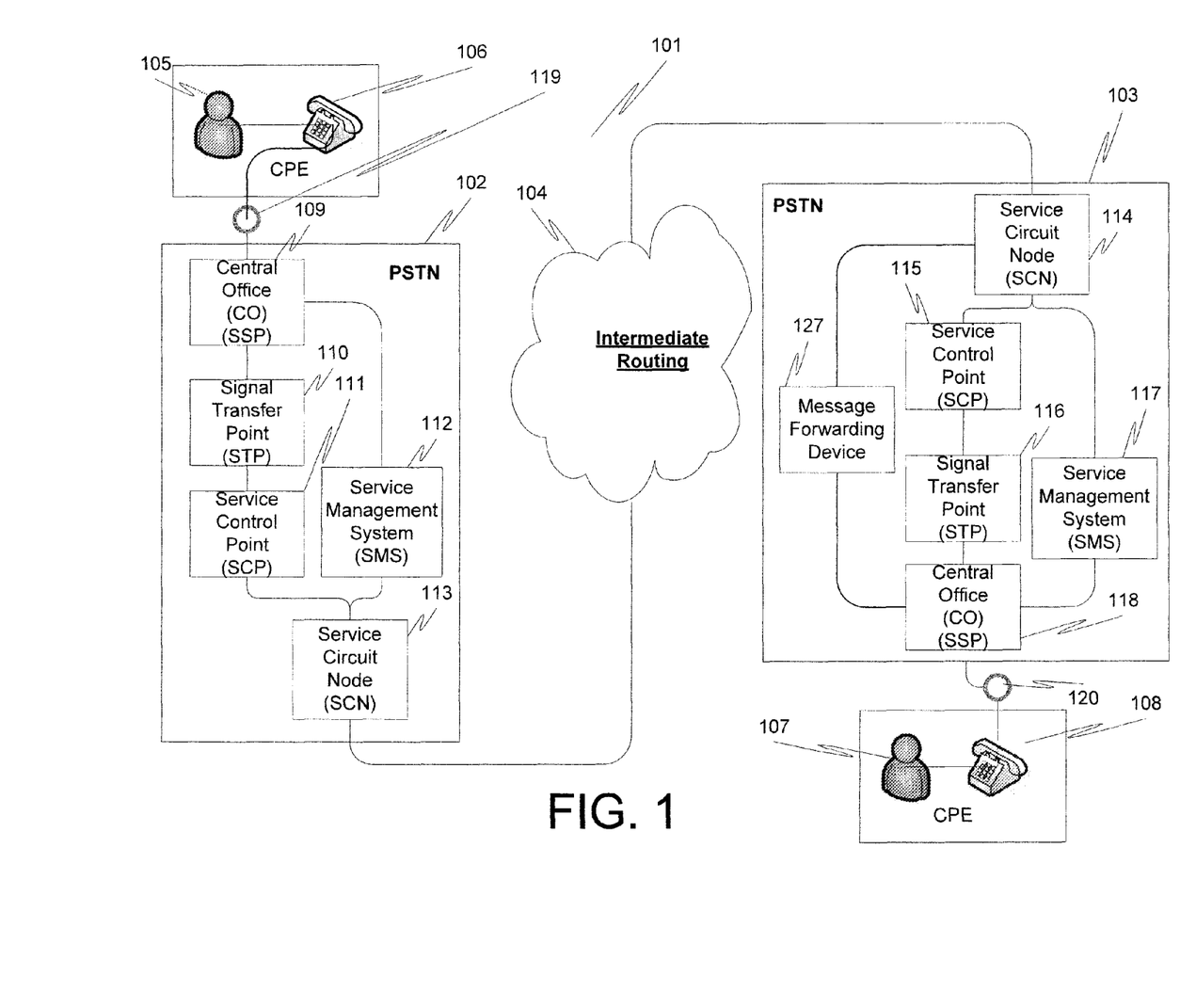
FIG. 1 is a block diagram of a telephone network configured to provide an embodiment of a message forwarding system.

In FIG. 1 there is disclosed a network diagram of telephone network 101 including a first local network 102, a second local network 103, both of which are part of the PSTN, and intermediate routing 104. There is also shown a first user 105 operating first CPE 106. As shown, first CPE 106 is communicatively coupled to first local network 102 through a first demarcation point 119, which represents a conceptual divider between equipment operated and maintained by the service provider and equipment operated and maintained by the customer. A first central office 109 is connected to a signal transfer point 110 which is connected to a service control point 111. Service control point 111 is then connected to a service circuit node 113. As shown in parallel, there is also connected to central office 109 a first service management system 112 which is connected to service circuit node 113.

Service circuit node 113 provides an interface to intermediate routing 104. Intermediate routing 104 may include a number of interconnection technologies and techniques, for example, additional PSTN nodes, fiber-optic routing, internet protocol (IP) routing, satellite connectivity and wireless connectivity. Intermediate routing 104 then connects to a second local network 103, which is also part of the PSTN, and which includes a second service circuit node 114. There is also shown a second service control point 115 connected to second service circuit node 114, a second signal transfer point 116, a second central office 118, and as shown parallel thereto, a second service management system 117. A message forwarding device 127 interfaces with both service circuit node 114 and central office 118. Message forwarding device 127 is adapted to receive data from the PSTN and forward one or more messages when specified conditions are met. In one embodiment, message forwarding device 127 may be located away from second CPE 108. For example, in such embodiment, message forwarding device 127 may be located in central office 118. Message forwarding device 127 may include a computer as in the embodiment more fully described in FIG. 2, or other programmable or hard-masked device such as a field programmable gate array, a complex programmable logic device, a programmable logic array, a programmable array logic, a microcontroller, or an application-specific integrated circuit. The second local network 103 is connected through a second demarcation point 120 to second CPE 108 operated by a second user 107.

Figure 2:
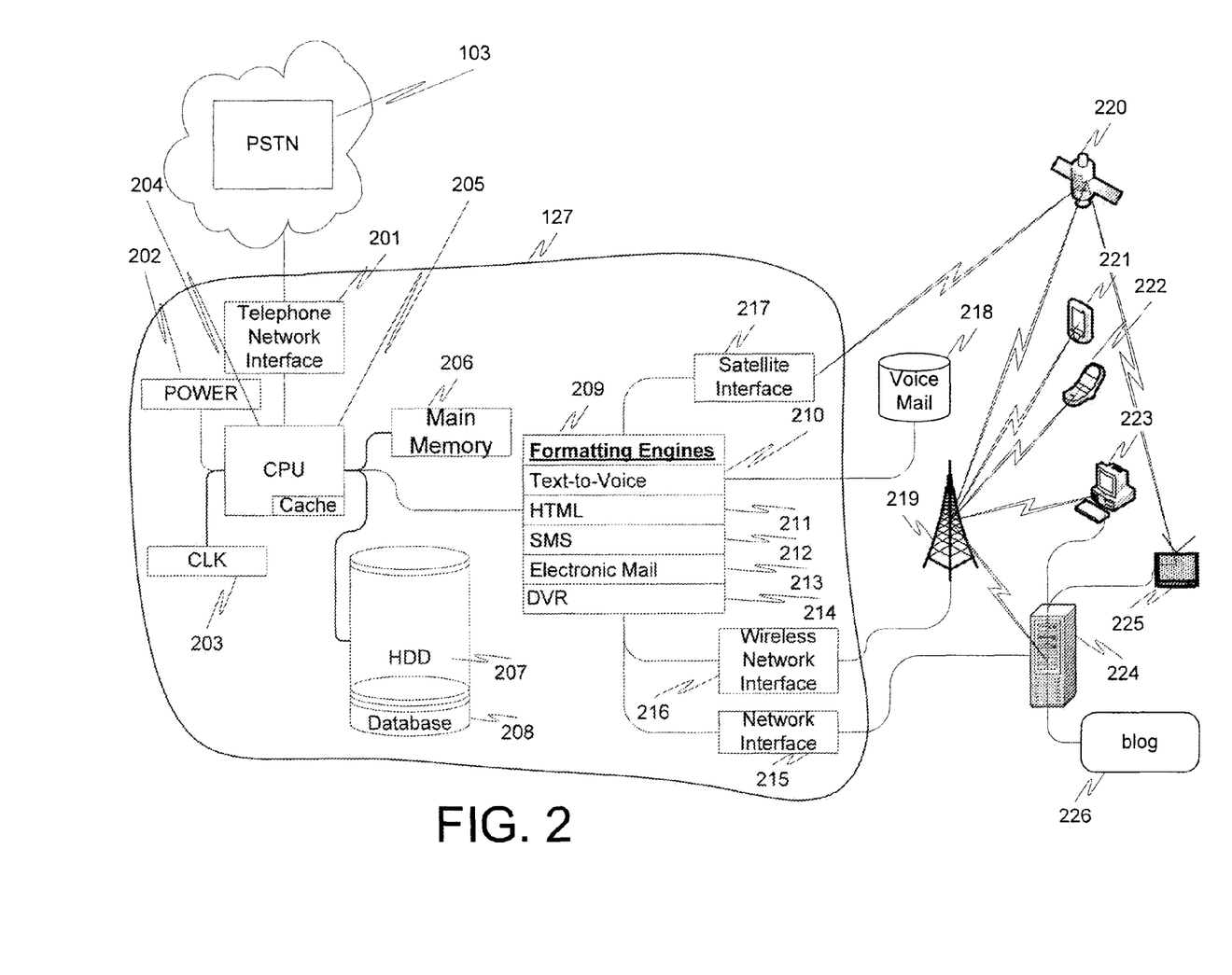
FIG. 2 is a block diagram of selected elements of an embodiment of a message forwarding system.

FIG. 2 illustrates in block diagram form selected elements of an embodiment of a message forwarding device 127. As shown, a message forwarding device 127 includes a telephone network interface 201, which communicatively couples the message forwarding device 127 to a second local telephone network 103. Message forwarding device 127 may be a standalone computer system, a network of computer systems, or any other suitable computing or processing device. Telephone network interface 201 may be integrated into message forwarding device 127 or may be a standalone device operatively connected with message forwarding device 127. Message forwarding device 127 includes a central processor unit 204 and may be provided with a cache memory 205, a power supply 202, and a clock 203. Message forwarding device 127 further includes main memory 206, which may be volatile random access memory or other low-latency memory. Further, as shown, message forwarding device 127 includes computer readable storage medium 207. Storage medium 207 may be a non-volatile storage medium such as a hard disk drive that includes subscriber information database 208. In other embodiments, storage medium 207 may include volatile storage including, as examples, dynamic random access memory and static random access memory, read-only memory, and flash memory, as well as other forms of persistent or non-volatile memory including magnetic and optical disk-based storage mediums. Database 208 may include records for a number of subscribing users. Each record may include the subscribing user's phone number (which can also be used as a primary key), the user's name, the user's preferred message format, the user's preferred secondary communication device, and if necessary, routing information for the user's secondary communication device. The routing information may be a phone number, an IP address, a voice mail box number, a blog uniform resource locator, or a reference number for routing internal to the service provider's system.

Message forwarding device 127 is also provided with a number of formatting engines 209. These may include a text-to-voice engine 210, a hypertext markup language (HTML) formatting engine 211, an SMS formatting engine 212, an electronic mail (e-mail) formatting engine 213, or a digital video recorder (DVR) message formatting engine 214. The formatting engines 209 provide data to a number of interfaces, including a wired network interface 215, a wireless network interface 216, and a satellite interface 217. There are also shown a number of secondary communication devices which may include a voice mail box 218, a wireless e-mail device 221, a mobile telephone 222, a personal computer (PC) 223, and a DVR 225. In some embodiments, DVR 225 may be a set-top box or other similar appliance enabled for converting IP based streams containing multimedia content for presentation on televisions and other displays. In one embodiment, the text-to-voice formatting engine 210 provides a voicemail message directly to voice mailbox 218, which is operated by the service provider. In other embodiments, data may be relayed via satellite to the satellite interface 217 to an orbiting satellite 220, which may then provide communication, for example, to a satellite television service connected to DVR 225. Alternatively, satellite 220 may provide information to a wireless radio tower 219, which may then provide wireless signals to various devices such as wireless e-mail device 221, mobile telephone 222, PC 223, or server 224. In still other embodiments, wireless network interface 216 provides data directly to wireless radio tower 219, which then provides wireless data to a plurality of devices. In yet other embodiments, wired network interface 215 provides data to server 224, which may then relay the data to a variety of devices, such as PC 223, DVR 225, or internet blog 226.

Figure 3:
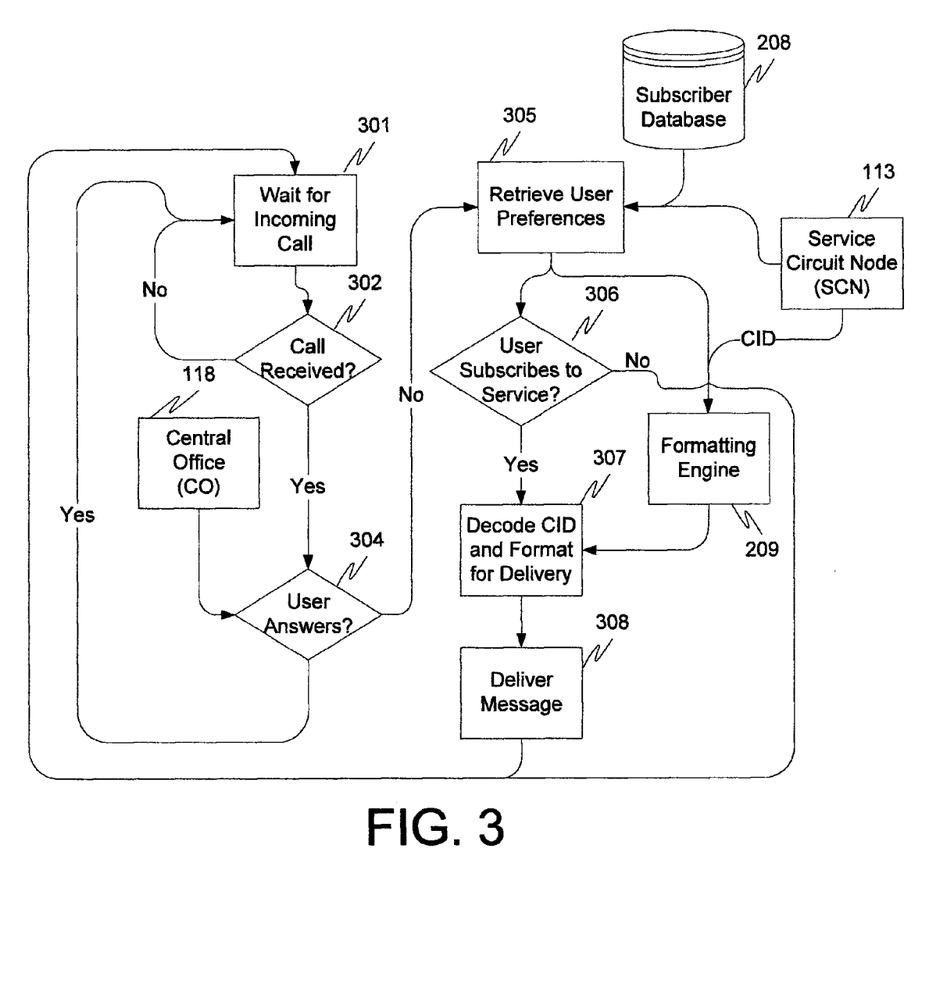
FIG. 3 is a flow diagram of a method of identifying a subscribing user and forwarding CID information to the subscribing user employed in one embodiment of the message forwarding system of FIG. 2.

FIG. 3 illustrates a flow chart with operations for forwarding a message to a subscribing user. As shown in steps 301 and 302, there is a continuous loop waiting for an incoming call. At step 302, if a call is received, then in step 304 it is determined whether the user answers, or in the alternative, whether the user misses the call. As shown, this determination may be made by the central office 118. A signal is provided to service circuit node 113 indicating whether the call has been answered. In one embodiment, service circuit node 113 is connected to message forwarding device 127 (FIG. 2), which includes subscriber information database 208. User preferences are retrieved in step 305 from subscriber information database 208. In step 306, there is a check to see whether the user subscribes to the message forwarding service. If yes, then in step 307 CID data and user preferences are provided to formatting engine 209 and a CID message is decoded and formatted for delivery. In step 308, the message is delivered to the user's preferred device. Parallel to this process, if the user does not subscribe to the service, then there is a return to waiting for an incoming call at step 301. In one embodiment, the incoming call may also be delivered to the user's preferred device. In other embodiments, the incoming call may not be delivered to the user's preferred device.

In one embodiment, a number of formatting engines 209 (FIG. 2) are provided so that users are provided with a number of options for message delivery. As is shown in FIG. 2, types of formatting engines may include text-to-voice 210, HTML 211, SMS 212, e-mail 213, and DVR 214. Looking to FIG. 1 and FIG. 2, in an embodiment, a first user 105 operates first CPE 106 to place a phone call intended for second user 107. If second user 107 does not answer the call (for example, if second user 107 is not home or is on another telephone call) then CID information can be decoded and formatted in text-to-voice formatting engine 210 and delivered as a digitized voicemail on the second user's 107 voice mailbox 218, which may be hosted by the service provider. This allows the user to subscribe to and take advantage of the embodied system without owning any additional equipment. In another embodiment, SMS formatting engine 212 creates a short message that is sent to the second user's 107 mobile telephone 222 or wireless e-mail device 221. In yet another embodiment, an e-mail formatting engine 213 creates an email which can then be sent via satellite 220, or a wireless or wired network to a number of devices, including wireless e-mail device 221, cellular telephone 222, PC 223, or DVR 225. In still another embodiment, a message formatted for use by a DVR that is configured to receive or relay text messages may be provided by a wired network interface or satellite interface to DVR 225, which provides CID information to the second user 107. In some embodiments, DVR 225 may be a set-top box or other similar appliance used for receiving and converting multimedia content streams into formats usable by televisions. In some embodiments, DVR 225 is integrated into a television or other appliance.

In another embodiment, HTML formatting engine 211 formats an HTML message, which as shown in FIG. 2, may be provided via a networking interface to wired network interface 215, wireless network interface 216, or satellite interface 217 to a server 224. In turn, server 224 may then provide the HTML message as a post on the user's internet blog 226. Internet blog 226 may be an individual blog such as a personal webpage or it may be a site on a social networking service such as MySpace or Facebook. In an alternative embodiment, the message may be delivered regardless of whether the second user 107 completes or answers a call. This would allow the users of those social networking sites to show others whom they are staying connected with via telephone. In yet another embodiment, a system connected to first local network 102 tracks all outgoing calls, in addition to incoming calls, so that first user 105 can show on internet blog 226 whom he is calling. The first user 105 may also be enabled to provide a customized "signature" block (or any other desired message) which may be uploaded to an embodied message forwarding system and thereafter appended to the encoded CID data included with the first user's 105 outgoing calls.

Additional flexibility may be provided by options encoded within the database 208. For example, in one embodiment, a number of "customer service and delivery settings" are encoded within database 208. These settings may include one or more events requiring the forwarding of a message such as all missed calls or all incoming calls. The user may also elect to forward calls from all numbers, to forward all calls except calls from unknown numbers, to forward only out-of-area calls, to forward only calls from one or more designated numbers, or to forward calls from all numbers except for one or more designated numbers. One application of this setting would be in an embodiment wherein messages are delivered to internet blog 226, which may be a social networking site. The user may specify the phone numbers of friends who are also connected to internet blog 226, and the user may specify that CID information is displayed or forwarded only when those friends have called the user's phone number. In another embodiment, the user may elect to display not only all incoming calls from a list of numbers, but also all outgoing calls made to a list of numbers.

In another embodiment, message forwarding device 127 may be configured to communicate with a plurality of target devices, including wireless e-mail device 221, mobile telephone 222, PC 223, DVR 225, or internet blog 226 as shown in FIG. 2. A user may designate to which target device messages should be delivered, and may also designate different times of day or other periods when such messages should be delivered. For example, a user may specify that during working hours on weekdays, messages should be delivered to a wireless email device 221, but on weekends and after working hours, the messages should be delivered to PC 223. In other embodiments, settings may be provided to define classes of phone calls and designate different target devices for each class. For example, a user who may receive personal calls, business calls and other miscellaneous calls can define each of these as a class. The user may then designate selected telephone numbers as personal calls, and calls from those numbers will be delivered to internet blog 226. Other incoming numbers may be designated as business calls. Business calls may be delivered as text messages to mobile telephone 222 or wireless email device 221. And miscellaneous or unknown numbers may be designated "unknown" and delivered as electronic mail to PC 223. Embodied systems that are connected to the PSTN have access to a plurality of different delivery media and mechanisms and provide a multitude of possibilities for delivery, which may be specified by a customer service and delivery setting.

Figure 4:
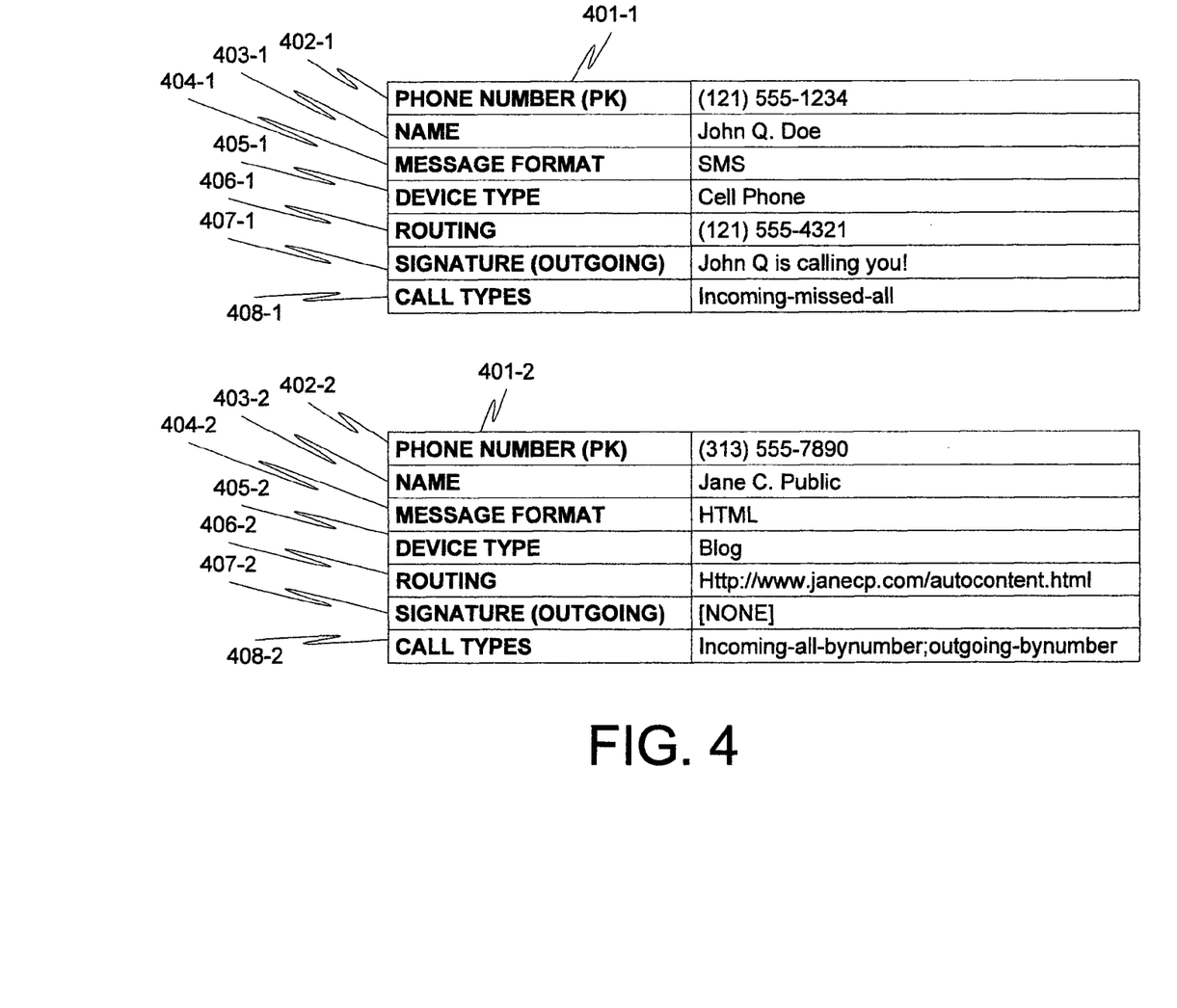
FIG. 4 illustrates details of records of a database included in an embodiment of the message forwarding system of FIG. 2.

FIG. 4 illustrates an example report of a first database record 401-1 and a second database record 401-2. Displayed in the report are fields including phone number 402, which acts as the primary key, name 403, message format 404, device type 405, routing address 406, a signature for appending to outgoing CID data 407 and a selection of call types 408. In first record 401-1, the phone number field 402-1 contains the value "(121) 555-1234". This indicates that a user associated with this number subscribes to a message forwarding service. As shown in the name field 403-1, the user's name is John Q. Doe. His preferred message delivery format 404-1 is SMS, and the message should be delivered to his preferred device 405-1, which is a cell phone. The phone number (call routing information) 406-1 for the cell phone is (121) 555-4321. He has selected a "signature" for outgoing calls 407-1. In some embodiments, this signature is only shown to other subscribers of the message forwarding service. So if John Q. Doe calls a subscriber to the service, the CID message may read "John Q. is calling you! (121) 555-1234". But if he calls a non-subscriber, the non-subscriber's CPE will show a standard CID message such as "John Q. Doe; (121) 555-1234." For call types 408-1, John Q. Doe has elected to have CID data for all missed incoming calls forwarded to his cell phone as a text message.

In the second record 401-2, the user 403-2 is Jane C. Public with phone number 402-2, which as shown is (313) 555-7890. She prefers to receive messages formatted as HTML and posted to her blog. The routing 406-2 indicates an address to which the automatically-generated content can be delivered. As shown in 407-2, she has no outgoing signature. For call types 408-2, she has elected to receive all incoming calls from her list of approved numbers, regardless of whether she misses the call or not. She also has elected to receive a message for all calls she places to her list of approved numbers. There may be one or more lists of phone numbers related to this database record that would indicate the proper type of handling for each type of number.

The systems described herein may derive advantages by providing the message forwarding service at the PSTN. This provides capabilities that cannot feasibly be provided on CPE because the PSTN has direct access to a wide variety of communication services. Furthermore, because the systems reside on the PSTN, additional services can be provided as they become available without the user needing to purchase or upgrade any equipment. As an additional advantage, even in emergencies where phone service is completely disrupted, subscribing users can still see if they have received important phone calls. There are also advantages over providing message forwarding at the intermediate routing stage 104. For example, service can be provided even if users do not have the latest equipment, such as third generation wireless communication (3G). This means that the system is easily adaptable to take advantage of evolving technologies without requiring end users to purchase expensive new or upgraded equipment. There is also an increased adaptability to a plurality of delivery methods.

While the disclosed systems may be described in connection with one or more embodiments, it is not intended to limit the subject matter of the claims to the particular forms set forth. On the contrary, it is intended to cover such alternatives, modifications and equivalents as may be included within the spirit and scope of the subject matter as defined by the appended claims.

What is claimed is:

1. A non-transitory computer readable storage medium, including processor executable program instructions that when executed by a processor, cause the processor to perform operations comprising:
   detecting a call to an intended recipient, wherein the call includes caller identification information;
   determining that the intended recipient subscribes to a message forwarding service;
   classifying the call according to classification criteria;
   comparing the caller identification data for a match with identity data specified by the intended recipient; and
   when the match is detected:
      selecting a secondary communication target from among a list of secondary communication targets based at least, in part, on the classification criteria;
      composing a first message, wherein the first message includes at least a portion of the caller identification information;
      delivering the first message to a secondary communication target, wherein the secondary communication target is an individual blog of the intended recipient;
      determining that the caller has initiated an outgoing call; and
      delivering a second message to the secondary communication target, the second message comprising identification data for a called party of the outgoing call.

2. The medium of claim 1, wherein the operations include: determining that an event requiring delivery of the message has occurred.

3. The medium of claim 2, wherein the event includes the call being unanswered.

4. The medium of claim 1, wherein the operations include: delivering a second version of the message as a short messaging service message to a third communication target.

5. The medium of claim 1, wherein the operations include: determining that the intended recipient wishes to receive the caller identification information at the secondary communication target.

6. The medium of claim 1, wherein the individual blog includes a social networking site.

7. The medium of claim 1, wherein the individual blog includes a personal webpage.

8. The medium of claim 1, wherein the classification criteria include a condition that the call originated from a number not designated.

9. The medium of claim 1, wherein the classification criteria include a condition that the call was received during a designated time period.

10. A message forwarding device, comprising:
    a processor;
    a first network interface configured to communicatively couple the processor to a telephone network;
    a database stored in a storage medium accessible to the processor, the database including class definition data and further including data indicative of information selected from:
       whether a user subscribes to a message forwarding service;
       routing information for at least one of a plurality of secondary communication targets; and
       whether an event requiring a message to be forwarded has occurred;
    a second network interface to communicatively couple the processor to at least one of the plurality of secondary communication targets; and
    a computer readable medium including processor executable instructions, which when executed by the processor, cause the processor to perform operations including:
       formatting a plurality of messages;
       verifying that the user subscribes to the message forwarding service;
       detecting an occurrence of the event requiring the message to be forwarded;
       classifying an incoming call according to the class definition data;
       selecting a secondary communication target from the plurality of secondary communication targets based at least, in part, on the classification;
       forwarding a first message to the secondary communication target through the second network interface, wherein the secondary communication target is an individual blog of the user wherein the first message includes at least a portion of the caller identification information;
       determining that the user has initiated an outgoing call; and
       delivering a second message to the secondary communication target, the second message comprising identification data for a called party of the outgoing call.

11. The message forwarding device of claim 10, wherein the event requiring the first message to be forwarded includes a call being unanswered.

12. The message forwarding device of claim 10, wherein the individual blog includes a webpage selected from the group consisting of a personal webpage and a social media website.

13. The message forwarding device of claim 10 wherein the class definition data includes data describing a class of telephone calls.

14. The message forwarding device of claim 13 wherein the class definition data categorizes telephone calls originally from one of a designated time period, a telephone number designated as a business number, a telephone number designated as a personal number, and a non-designated telephone number.

15. A method of providing a message forwarding service, the method comprising:
    determining that a received call is directed to a user subscribing to a message forwarding service;
    determining caller identification data associated with the received call;
    comparing the caller identification data for a match with identity data specified by the user; and
    when the match is detected:
       selecting a secondary communication target associated with the user;

creating a first message comprising at least part of the caller identification data, wherein the first message is formatted for sending to the secondary communication target; and delivering the first message to the secondary communication target, wherein the secondary communication target is an individual blog of the user;

determining that the user has initiated an outgoing call; and delivering a second message to the secondary communication target, the second message comprising identification data for a called party of the outgoing call.

16. The method of claim 15, wherein the individual blog includes a personal webpage.

17. The method of claim 15, wherein the individual blog includes a social media website.

18. The method of claim 15, further comprising delivering a second version of the message as a short messaging service message to a third communication target.

19. The method of claim 15 wherein the received call is not delivered to the secondary communication target.

20. The method of claim 15, wherein the classification criteria comprise a condition selected from a set of conditions consisting of: a condition that the received call originated from a phone number designated as a business phone number, a condition that the received call originated from a phone number designated as a personal phone number, a condition that the received call originated from a phone number not designated, and a condition that the received call was received during a designated time period.

21. The method of claim 15, further comprising:

determining that the user has initiated an outgoing call; and delivering a second message to the secondary communication target, the second message comprising identification data for a called party of the outgoing call.

22. The medium of claim 1, wherein the operations include:

determining that the intended recipient has initiated an outgoing call; and delivering a second message to the secondary communication target, the second message comprising identification data for a called party of the outgoing call.

* * * * *

UNITED STATES PATENT AND TRADEMARK OFFICE
CERTIFICATE OF CORRECTION

Page 1 of 4

PATENT NO.      : 8,837,691 B2
APPLICATION NO. : 11/948770
DATED           : September 16, 2014
INVENTOR(S)     : Knight It is certified that error appears in the above-identified patent and that said Letters Patent is hereby corrected as shown below:

<u>In the Claims</u>

Please rearrange, amend, and/or renumber claims 10-22 as follows:

Column 7, line 64,

[[22]] <u>10</u>. The medium of claim 1, wherein the operations include:

determining that the intended recipient has initiated an outgoing call; and delivering a second message to the secondary communication target, the second message comprising identification data for a called party of the outgoing call.

Column 8, line 40,

[[10]] <u>11</u>. A message forwarding device, comprising:

a processor;

a first network interface configured to communicatively couple the processor to a telephone network;

a database stored in a storage medium accessible to the processor, the database including class definition data and further including data indicative of information selected from:

whether a user subscribes to a message forwarding service;

routing information for at least one of a plurality of secondary communication targets; and whether an event requiring a message to be forwarded has occurred;

a second network interface to communicatively couple the processor to at least one of the plurality of secondary communication targets; and Signed and Sealed this
Tenth Day of March, 2015

Michelle K. Lee
*Deputy Director of the United States Patent and Trademark Office* a computer readable medium including processor executable instructions, which when executed by the processor, cause the processor to perform operations including:

formatting a plurality of messages;

verifying that the user subscribes to the message forwarding service;

detecting an occurrence of the event requiring the message to be forwarded;

classifying an incoming call according to the class definition data;

selecting a secondary communication target from the plurality of secondary communication targets based at least, in part, on the classification;

forwarding a first message to the secondary communication target through the second network interface, wherein the secondary communication target is an individual blog of the user wherein the first message includes at least a portion of the caller identification information;

determining that the user has initiated an outgoing call; and delivering a second message to the secondary communication target, the second message comprising identification data for a called party of the outgoing call.

Column 8, line 43,

[[11]] 12. The message forwarding device of claim [[10]] 11, wherein the event requiring the first message to be forwarded includes a call being unanswered.

Column 8, line 47,

[[12]] 13. The message forwarding device of claim [[10]] 11, wherein the individual blog includes a webpage selected from the group consisting of a personal webpage and a social media website.

Column 8, line 50,

[[13]] 14. The message forwarding device of claim [[10]] 11 wherein the class definition data includes data describing a class of telephone calls.

Column 8, line 56,

[[14]] 15. The message forwarding device of claim [[13]] 14 wherein the class definition data categorizes telephone calls originally from one of a designated time period, a telephone number designated as a business number, a telephone number designated as a personal number, and a non-designated telephone number.

CERTIFICATE OF CORRECTION (continued)
U.S. Pat. No. 8,837,691 B2

Column 9, line 13,

[[15]] <u>16</u>. A method of providing a message forwarding service, the method comprising:

determining that a received call is directed to a user subscribing to a message forwarding service;

determining caller identification data associated with the received call;

comparing the caller identification data for a match with identity data specified by the user; and when the match is detected;

selecting a secondary communication target associated with the user;

creating a first message comprising at least part of the caller identification data, wherein the first message is formatted for sending to the secondary communication target; and delivering the first message to the secondary communication target, wherein the secondary communication target is an individual blog of the user;

determining that the user has initiated an outgoing call; and delivering a second message to the secondary communication target, the second message comprising identification data for a called party of the outgoing call.

Column 9, line 15,

[[16]] <u>17</u>. The method of claim [[15]] <u>16</u>, wherein the individual blog includes a personal webpage.

Column 9, line 18,

[[17]] <u>18</u>. The method of claim [[15]] <u>16</u>, wherein the individual blog includes a social media website.

Column 9, line 21,

[[18]] <u>19</u>. The method of claim [[15]] <u>16</u>, further comprising delivering a second version of the message as a short messaging service message to a third communication target.

Column 10, line 1,

[[19]] <u>20</u>. The method of claim [[15]] <u>16</u>, wherein the received call is not delivered to the secondary communication target.

Column 10, line 10,

[[20]] 21. The method of claim [[15]] 16, wherein the classification criteria comprise a condition selected from a set of conditions consisting of: a condition that the received call originated from a phone number designated as a business phone number, a condition that the received call originated from a phone number designated as a personal phone number, a condition that the received call originated from a phone number not designated, and a condition that the received call was received during a designated time period.

Column 10, line 15,

[[21]] 22. The method of claim [[15]] 16, further comprising:
 determining that the user has initiated an outgoing call; and
 delivering a second message to the secondary communication target, the second message comprising identification data for a called party of the outgoing call.